Patented June 29, 1943

2,322,979

UNITED STATES PATENT OFFICE 2,322,979

PROCESS OF MANUFACTURING ALCOHOL MODIFIED UREA FORMALDEHYDE RESINS

Ernst Fritz Siegel, Elizabeth, N. J., assignor to Reichhold Chemicals, Inc., formerly Beck, Koller & Company, Inc., Detroit, Mich.

No Drawing. Application July 7, 1941, Serial No. 401,343

8 Claims. (Cl. 260—70)

This invention relates to a method of producing alcohol modified urea formaldehyde resins, which method is more practical and economical than any heretofore described.

It is known to prepare such urea formaldehyde resins (1) by reacting urea with aqueous or anhydrous formaldehyde in the presence of alcohols, or (2) by producing first dimethylol-urea and then etherifying the dimethylol-urea with alcohols in order to render the product soluble in the common varnish solvents; (3) aqueous formaldehyde and urea have also been reacted in the absence of alcohol but the alcohol has been added to the initial aqueous reaction product and distilled off together with all the water. None of these processes are economical because when using aqueous formaldehyde the recovery of the alcohol from the mixed distillate of water, methanol (contained in the formaldehyde solution), and alcohol is difficult and expensive, while by using paraformaldehyde or dimethylolurea the manufacturing costs are much increased.

The essence of my invention consists in the discovery of a way to remove by vacuum distillation substantially all the water present in the condensation product formed from urea and aqueous formaldehyde, in the absence of alcohols or any other diluent and to etherify the resulting primary anhydrous reaction product with an alcohol, preferably a primary alcohol, thus producing in a more economical manner than was previously possible resins which are substantially equivalent to those already known and used in large quantities in the coating field. Only by following the definite method, which I have discovered is one able to dehydrate completely, and to etherify the anhydrous product with alcohols; otherwise insoluble precipitations (methylene urea) or crystalline (dimethylol-urea) or pasty masses may be formed which are very difficult to handle in production, and which make it impossible to complete the dehydration.

Among the important features of the process may be mentioned the following:

1. The aqueous formaldehyde solution should be applied in excess of the amount which can be combined chemically by urea. This is at least 2.5 molecules formaldehyde for 1 molecule of urea.

2. During the condensation of urea with formaldehyde a pH of 8–10 should be maintained.

3. The condensation between urea and formaldehyde should be carried out at 60°–90° C. and continued until the residue obtained by vacuum distillation is a fluid sirupy mass.

4. The urea formaldehyde condensate is dehydrated by vacuum distillation, a pH of 8–10 being maintained, until all the water, which was initially present in the aqueous formaldehyde and which was split off by partial resinification between urea and formaldehyde, has been removed. The final temperature in the residue should not be higher than 60° C.

5. The anhydrous condensation product is etherified by alcohols, an excess of the alcohol being employed, emulsifying the mixture by thorough agitation, adding an organic or inorganic acid to bring the pH to 5–6 and heating the mixture at 90°–95° C. until a homogeneous clear solution of the desired solubility characteristics is obtained.

6. The alcoholic resin solution is subjected to distillation at atmospheric or reduced pressure in order to adjust it to the desired solid content and remove simultaneously the water which has been formed during the etherification process. This small amount of water, distilling off together with the alcohol, may be disregarded, and the reclaimed alcohol may be reused in the following batch without any rectification.

The following examples will further illustrate how the said invention may be carried out in practice, but it will be understood that the invention in its broadest aspects is not restricted to these examples.

*Example 1.*—In 219 grams of aqueous formaldehyde solution of 37% by weight (=2.7 moles) 0.2 gram of solid sodium hydroxide are dissolved. Then 60 grams urea (=1 mole) are added and the mixture is heated up to 85° C. and held at this temperature for 1 hour. During this first step and the following dehydration a pH of 8–10 should be maintained. In case the solution shows at any point a lower pH, it should be corrected by addition of some more NaOH or other base. Then all the water is distilled off, applying vacuum of 26″–29″ until the temperature which is low at the beginning of the distillation starts rising and reaches finally 55°–60° C. The remainder is a sirupy mass which is not yet soluble in alcohols but can easily be mixed and emulsified in them. 225 grams n-butanol, containing 1 g. $H_3PO_4$ (75%) which brings the pH of the mixture to 5–6, are added and the composition is heated under good agitation up to 90°–95° C. until a clear solution is formed and the etherification of the methylol groups of the resin is brought to a degree where the resin possesses the desired hydrocarbon solubility. Finally the excess of alcohol and the small amount of water formed during the etherification process is distilled off under vacuum until the desired solid content is reached. The resin obtained is clear and water white and is an excellent base for varnishes. The distilled alcohol can be reused in the next batch without special rectification.

*Example 2.*—To 203 grams of aqueous formaldehyde solution of 37% by weight (=2.5 mols) 10 cc. of $NH_3$ (spec. grav. 0.9) are added. A much larger equivalent amount of $NH_3$ than of NaOH or other strong organic or inorganic bases has to be applied in order to prevent the reaction turning over to acid. Then 60 grams urea are added and the solution is heated up to 70° for 1 hour. Finally the complete dehydration at pH 8-10 and the etherification with n-butanol at a pH of 5-6 is carried out in the same manner as described in Example 1.

*Example 3.*—To 243 g. of aqueous formaldehyde solution of 37% by weight (=3 mol.) which have been mixed with 20 cc. of $NH_3$ (sp. gr. 0.9) 60 g. urea (=1 mol.) are added and this solution is then heated at 65° C. for 1 hour. After complete dehydration at pH 8-10 by distillation under vacuum, the clear sirupy residue is mixed with 265 g. n-amyl alcohol. After having adjusted the pH to 5-6 by addition of $H_3PO_4$, the mixture is heated under good agitation up to 90°-95° C. and held at this temperature until a clear solution is obtained and the etherification has taken place to the desired extent. Finally, the excess of amylalcohol and the small amount of water split off during the etherification process are removed as described in Example 1.

*Example 4.*—A solution consisting of the same amounts of aqueous formaldehyde, ammonia and urea as applied in Example 3 is heated at 65° C. for 1 hour. Then the complete dehydration is carried out as described before and the resulting sirupy mass mixed with a mixture of 75 g. n-butanol and 260 g. primary octylalcohol. Then the pH is adjusted to 5-6 by addition of HCl and finally the anhydrous urea formaldehyde condensation product is etherified with the alcohols in the same way as described in the foregoing examples.

I claim:

1. A process for producing resinous condensation products from urea, formaldehyde and an alcohol which consists of reacting urea with aqueous formaldehyde in a proportion of 1 to at least 2.5 molecules at 60°-90° C., and maintaining a pH of 8-10, until 2 molecules of formaldehyde are combined and the residue resulting by vacuum distillation is a sirupy but not crystalline or pasty mass, and then subjecting the reaction mixture to vacuum distillation at a pH of 8-10 until substantially all the water is removed, the final temperature of the residue being not higher than 60° C., and then etherifying the condensation product by heat reacting the same with an excess of a monohydric alcohol at a pH of 5-6 until a homogeneous solution is obtained and the originally hydrophile resinous product is transformed into a hydrophobe product soluble in hydrocarbons.

2. A process for producing resinous condensation products from urea, formaldehyde and an alcohol which consists of reacting urea with aqueous formaldehyde in a proportion of 1 to at least 2.5 molecules at 60°-90° C. and maintaining a pH of 8-10 until 2 molecules of formaldehyde are combined, and the residue resulting by vacuum distillation is a sirupy but not crystalline or pasty mass, and then subjecting the reaction mixture to vacuum distillation at a pH of 8-10 until substantially all the water is removed, the final temperature of the residue being not higher than 60° C., whereupon the condensation product is etherified with an excess of a monohydric alcohol at a pH of 5-6 by adding an acid and heating the mixture under good agitation at 90°-95° C. until a homogeneous solution is obtained and the originally hydrophile resinous product is transformed into a hydrophobe product soluble in hydrocarbons.

3. A process for producing resinous condensation products from urea, formaldehyde and an alcohol which consists of reacting urea with aqueous formaldehyde in a proportion of 1 to at least 2.5 molecules at 60°-90° C. and maintaining a pH of 8-10 until 2 molecules of formaldehyde are combined, and the residue resulting by vacuum distillation is a sirupy but not crystalline or pasty mass, and then subjecting the reaction mixture to vacuum distillation at a pH of 8-10 until substantially all the water is removed, the final temperature of the residue being not higher than 60° C., whereupon the condensation product is etherified with an excess of a monohydric alcohol and then subjected to distillation under not greater than atmospheric pressure in order to remove the excess of alcohol and the small amount of water formed while being treated with the alcohol.

4. A process for producing an alcohol modified urea formaldehyde resin, wherein aqueous formaldehyde is used as one of the starting ingredients, which comprises first reacting urea with aqueous formaldehyde, at a temperature of 60-90° C. using formaldehyde in a proportion of at least 2.5 mols of formaldehyde per mol of urea, and maintaining a pH of 8-10 until 2 moles of formaldehyde have combined with the one mole of urea, and continuing the reaction until the residue obtained by vacuum distillation is a fluid syrupy mass, then dehydrating the urea formaldehyde condensate by vacuum distillation until substantially all the water initially present in the aqueous formaldehyde and that which was split off in the condensation reaction is removed, maintaining a pH of 8-10 and a temperature of not above 60° C. during the dehydration step, and then etherifying the anhydrous condensation product by adding an excess of a monohydric alcohol, emulsifying the mixture by thorough agitation, adjusting the pH to 5-6 and heating the mixture at 90-95° C. until a homogeneous solution is obtained and the originally hydrophile resinous product is transformed into a hydrophobe product soluble in hydrocarbons, and finally subjecting the solution to distillation at not greater than atmospheric pressure until the excess alcohol and the small quantity of water formed during etherification are driven off and a resin of the desired solid content is obtained.

5. A process as set forth in claim 4 wherein the alcohol employed is a primary alcohol.

6. A process as set forth in claim 4 wherein the alcohol employed is butanol.

7. A process as set forth in claim 4 wherein the alcohol employed is amyl alcohol.

8. A process as set forth in claim 4 wherein the alcohol employed comprises octyl alcohol.

ERNST FRITZ SIEGEL.